United States Patent [19]

Katz

[11] 3,816,939

[45] June 18, 1974

[54] METHOD FOR DRYING POLYMERS

[75] Inventor: Edward Katz, St. Louis, Mo.

[73] Assignee: Anheuser-Busch, Incorporated, St. Louis, Mo.

[22] Filed: June 4, 1973

[21] Appl. No.: 366,651

[52] U.S. Cl. ............................................ 34/9, 34/12
[51] Int. Cl. ........................... F26b 3/00, F26b 3/12
[58] Field of Search ............................... 34/9, 12, 21

[56] References Cited
UNITED STATES PATENTS
3,383,773   5/1968   Nugent .................................... 34/9

*Primary Examiner*—John J. Camby
*Attorney, Agent, or Firm*—Gravely, Lieder & Woodruff

[57] ABSTRACT

This application discloses a method of drying polymers and specifically concerns a method of drying hydroxypropyl cellulose acetate. Other polymers which tend to stick ball or cake significantly during conventional drying may be dried using this disclosure. The polymer to be dried must contain from 5 to 75% volatiles and may contain organic solvents. The process includes the steps of adding from 0.1% to 10% (on a dry solids basis) of a hydrophobic silane-derivatized silicon dioxide in finely powdered form to the polymer to be dried; mixing the materials to make the normally sticky polymer substantially free flowing in nature; and drying the product in a conventional manner.

8 Claims, No Drawings

METHOD FOR DRYING POLYMERS

BACKGROUND OF THE INVENTION

Most anti-caking agents absorb water in amounts up to several times their own weight. Thus, if one were to add such an anti-caking agent on a 1 percent dry solids basis to a 100 lb. batch of polymer cake containing 30 percent moisture, the anti-caking agent would, at best, tie up 1½ to 3 lbs. of the total 30 lb. of water in the cake which would leave most of the moisture intact in the polymer. Use of this type anti-caking agent would essentially serve no useful purpose in reducing the sticking or caking properties of the wet polymer cake. The conventional type anti-caking agents which take up or absorb moisture are useful only when used on dry or almost dry materials to make the materials free flowing.

Accordingly, it is a principal object of this invention to provide a process for drying moisture containing polymers in which a silane-derivatized silicon dioxide is added to the wet polymer to make the polymer free flowing and capable of being dried without sticking, caking and gumming. It is also an object to provide a process in which higher drying temperatures can be used to dry wet polymers without caking, thus reducing the cost and drying time of the polymer. These and other objects and advantages will become apparent hereinafter.

SUMMARY OF THE INVENTION

The present invention comprises a method for drying difficult to dry polymers, which contain about 5 percent to about 75 percent volatiles and may contain small amounts of organic type solvents, in which a hydrophobic silane-derivatized silicon fine powder is added to the polymer prior to drying.

DETAILED DESCRIPTION

This invention is applicable to materials which, when combined with water in the presence of some organic solvents, tend to become sticky, ball, or cake. Such materials at high moisture levels are very difficult to dry. An example of such materials is a hydroxypropyl cellulose acetate polymer of 200,000 to 1,500,000 molecular weight and 1.0 to 1.6 degree of substitution. Other such materials (designated in this specification as polymers which are difficult to dry in aqueous systems) include starch laurate and hydroxypropyl cellulose.

The specific polymer is made by reacting hydroxypropyl cellulose with acetic anhydride according to the following procedure: About 60 to about 90 lbs. of hydroxypropyl cellulose is dispersed in about 30 to about 60 gal. of hexane containing about 40 to about 60 lbs. pyridine catalyst. About 50 to about 80 lbs. of acetic anhydride are added and reacted for about 0.5 to about 2 hours at about 20° to about 40° C. The solvents are decanted and the mixture is washed with water and neutralized with about 5 to about 10 lbs. sodium bicarbonate. The wet cake is collected by filtration and has to be dried. Conventional drying which does not use the procedure of this invention involves temperatures no higher than 120° F., preferably 100° F. in a hot air oven. At those low temperatures drying is slow and caking occurs. It is necessary to frequently break up the lumps during drying to obtain a properly dried product. The product of this reaction before drying is hydroxypropyl cellulose acetate of about 200,000 to about 1,500,000 molecular weight, about 1.0 to about 1.6 degree of substitution and contains about 20% to about 60% volatiles by weight and there is about 2% to about 40% by weight organic solvent present in the volatiles. The amount of organic solvent varies depending upon the efficiency of the water wash.

To such water containing polymer is added a silane-derivatized silicon dioxide in finely powdered form. A suitable material is SILANOX 101 made by Cabot Corporation. Such material has a surface area of approximately 225 M²/gm.; an average particle size of 7 Mµ; a bulk density of about 3 lbs./cu. ft.; a specific gravity of about 2.2 and an amorphous structure. The pH of a 4% dispersion in 50% isopropyl alcohol and 50% water is 8-10. The material itself is a white powder.

The chemical structure of the material is as follows:

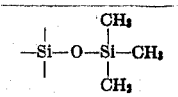

A trimethylsilyl group is formed on the surface of the base fumed silicon dioxide after the reaction with silane.

About 0.1% to about 10% of the silane-derivatized silicon dioxide by weight, based on the dry solids of the polymer to be dried, can be added to the polymer. Larger amounts can be used in special situations. Preferably about 1% to about 3% by weight is used. The polymer to be dried can contain about 25% to about 95% by weight of dry substance and about 40% of organic solvents by weight of the volatile portion. Usually about 5 to about 75% by weight volatiles are present.

In addition to water, other solvents in small quantities could be trapped in the system. These solvents include hexane, heptane, benzene, toluene, etc. The more non-polar the solvent trapped in the aqueous polymer system, the less of the silane-derivatized silicon dioxide is needed as a drying aid. The additive disperses better in polar solvents than it does in non-polar solvents and thus more is needed if a more polar solvent is present in the system.

An advantage of this process is that higher drying temperatures and shorter drying times can be used in the actual drying process. In practice, I use drying temperatures of about 10° F. to about 80° F. higher than those normally used without the additive, and still obtain a properly dried lump-free material. Without the additive the material tends to lump and does not dry properly. Actual drying temperatures are about 100° F. to about 180° F. Actual drying times can vary between about 1 hour to about 40 hours and are dependent upon many factors: the type of drier used, temperature, bed thickness, feed volatile level and drying aid level. The polymer containing the hydrophobic silane-derivatized silicon dioxide powder can be dried in any conventional manner, i.e., by vacuum drying, fluidized bed drying, or warm air drying. When so dried, the polymer does not ball or agglomerate into large masses.

The additive does not absorb moisture as it is hydrophobic. It is believed that the additive prevents coalescing of the water particles because it is hydrophobic.

This prevents sticking or caking of the polymer even with the high water level. The water level of the polymer on a dry solids basis is the same after adding of the silane-derivatized silicon dioxide powder as before because the additive does not take up water from the polymer, but merely makes the wet polymer relatively free flowing. The silane-derivatized silicone dioxide must be added and mixed into the polymer before drying to achieve the benefits of this invention.

Following are detailed examples of this invention:

EXAMPLE 1

A 101 lb. batch of Fitz-milled particles of about 1/16 inch to about ⅜ inch size of hydroxypropyl cellulose acetate polymer containing 24 to 28% volatiles which is estimated to contain about 3% hexane on a dry solids basis which would account for about 10% of the volatiles on a dry solids basis. The polymer has a 1.6 degree of substitution and is charged into a Fitzpatrick drier fitted with a slow turning agitator at an air temperature of 125° F. After 5 minutes, the material is formed into a number of 3 to 4 inch diameter balls and in this state the material is not capable of fluidizing and does not possess free flowing properties. The unit is shut down and the material is removed. This type material is very difficult to dry.

A 158 lb. batch of the same polymer as in the previous procedure containing 24 to 28% volatiles is charged to the same drier. A 0.6% level on a dry solids basis of silane-derivatized silicon dioxide having a surface area of 225 $M^2/gm$. average and particle size of 7 $M\mu$ and a specific gravity of 2.2 (SILANOX 101) is mixed with the hydroxypropyl cellulose acetate polymer. The air temperature is increased to about 140° to 150° F. Fluidization occurs immediately and exists throughout the run. The drying process yields a granular free flowing white polymer that does not stick, ball or gum during the drying. The following table, Table I, shows the drying time necessary to achieve complete removal of moisture from the polymer.

TABLE I

| Time (min.) | % Moisture in Polymer |
|---|---|
| 10 | 18.0 |
| 30 | 4.9 |
| 60 | 0.6 |
| 90 | 0.0 |

EXAMPLE 2

A wet cake of hydroxypropyl cellulose acetate polymer containing 25% volatiles which includes about 3% dry solids basis hexane which would account for about 12% of the volatiles is treated with 0.5% on a dry solids basis of a fumed silica (Cab-O-Sil manufactured by Cabot Corporation). This is a conventional anti-caking material. The wet cake is spread in a thin layer, approximately ½ inch thick, in Procter Schwartz hot air drier oven and is dried at an air temperature of 100° F. Considerable sticking and caking occurs at this low temperature and this is overcome by raking and breaking up the material in the oven trays by hand. After 2½ hours the relatively dry product has 3.8% moisture.

A wet cake of the same hydroxypropyl cellulose acetate polymer but at 28% volatiles of which about 12% is hexane solvent, is treated with 0.5 grams of silane-derivatized silicon dioxide (SILANOX 101). The wet mixture is placed onto a 40 mesh screen and spread in a layer 1½ inches thick. The polymer is then placed into the hot air drier oven at an air temperature of approximately 167° F. The polymer after 4 hours and 10 minutes was a substantially dry, free flowing, granular product. No breaking or mixing of the material was required throughout the drying although the bed was several times the thickness of the bed of the polymer dried without the silane-derivatized silican dioxide. The following table, Table II, shows the drying time of the polymer bed.

TABLE II

| Time | % Volatiles of Polymer |
|---|---|
| 0 | 28.00% |
| 2½hrs. | 6.80% |
| 4 hrs. 10 min. | 0.25% |

EXAMPLE 3

Three batches (lettered A, B, C) of hydroxypropyl cellulose polymer (Klucel manufactured by Hercules, Inc.) were prepared for drying in a Fitzpatrick drier oven set at 170° F. Each contained approximately 75% moisture but no organic solvents.

Batch A contained 303 g. of the polymer having approximately 74.9% moisture with no drying aid.

Batch B contained 304 g. of the polymer having approximately 75.0% moisture and mixed with approximately 1% dry solids basis of the silane-derivatized silicon dioxide used in Example 1.

Batch C contained 363 g. of the polymer having approximately 74.9% moisture and is mixed with approximately 2% dry solids basis of the silane-derivatized silicon dioxide used in Example 1.

The drying times of these three batches of hydroxypropyl cellulose at 170° F. is seen in the following table.

TABLE III

| | A | | | B | | | C | | |
|---|---|---|---|---|---|---|---|---|---|
| | Without Silanox | | | 1 percent Silanox | | | 2 percent Silanox | | |
| | Total wt. gms. | Moisture wt. gms. | Moisture percent | Total wt. gms. | Moisture wt. gms. | Moisture percent | Total wt. gms. | Moisture wt. gms. | Moisture percent |
| Start | 303 | 227 | 74.9 | 304 | 228 | 75.0 | 363 | 337 | 74.9 |
| 1 hr. | 206 | 130 | 63.1 | 183 | 107 | 58.5 | 156 | 80 | 51.3 |
| 2 | 185 | 109 | 58.9 | 141 | 65 | 46.1 | 101 | 25 | 24.8 |
| 3 | 162 | 86 | 53.7 | 108 | 32 | 29.6 | 77 | 1 | 1.3 |
| 4 | 143 | 67 | 46.8 | 89 | 13 | 14.6 | 76 | — | — |
| 5 | 130 | 54 | 41.5 | 77 | 1 | 1.3 | — | — | — |
| 6 | 119 | 43 | 36.1 | 76 | — | — | — | — | — |
| 7 | 88 | 12 | 13.6 | — | — | — | — | — | — |
| 8 | 78 | 2 | 2.6 | — | — | — | — | — | — |
| 9 | 76 | — | — | — | — | — | — | — | — |

NOTE:— indicates dry.

It is seen from the table that Batches B and C containing the silane-derivatized silicon dioxide had substantially shorter drying times. Batch A when dried, was lumpy, with the polymer sticking and balling together. By visual inspection, Batch B, containing 1% of the silane-derivatized silicon dioxide, had few lumps. Batch C, containing 2% of the silane-derivatized silicon dioxide, contained almost no lumps.

EXAMPLE 4

A hydroxypropyl cellulose acetate polymer with a D.S. of about 1.47 to about 1.52 is drained on a 60 mesh screen to remove excess moisture. A wet cake is left containing 50% volatiles. It is treated with 2.27% dry solids basis silane-derivatized silicon dioxide as used in Example 1. The wet cake is broken and spread in layers of 0.5, 1.0, 1.5 and 2.0 inches in thickness in a Proctor Schwartz hot air drier oven and dried at an air temperature of 125° F. Table IV shows the time required for the wet cakes of varying thicknesses to reach 1% moisture content without lumping or caking.

TABLE IV

| Thickness of cake (inches) | 0.5 | 1 | 1.5 | 2.0 |
|---|---|---|---|---|
| Time in Hours | 4 | 9 | 16 | 23 |

EXAMPLE 5

A hydroxypropyl cellulose acetate polymer slurry is centrifuged at 500–1,000 G's for 1–2 minutes into a dewatered wet cake containing 26% volatiles. The wet cake is spread in a layer of 0.5, 1.0, and 1.5 inches in thickness. It is divided into three sections and the sections are treated respectively with 0.43%, 0.85% and 1.28% silane-derivatized silicon dioxide, the same as used in Example No. 1. The polymers are then placed in a Proctor Schwartz hot air drier oven and dried at an air temperature of 125° F. Table V shows the time required for the wet cakes of varying thicknesses to reach 1% moisture content without lumping or caking.

TABLE V

| % Drying Aid | Thickness of Cake (inches) | | |
|---|---|---|---|
| | 0.5 | 1.0 | 1.5 |
| | Time in Hours | | |
| 0.43 | 3.75 | 8.0 | 12.0 |
| 0.85 | 2.75 | 6.0 | 9.0 |
| 1.28 | 2.25 | 5.0 | 6.0 |

Lower amounts of the silane-derivatized polymers can be used with lower starting volatile levels.

EXAMPLE 6

A hydroxypropyl cellulose acetate polymer slurry is dewatered on a 60 mesh screen. The volatile level of the residual wet cake is 47% by weight. The wet cake is spread in a layer of 0.5, 1.0 and 1.5 inches in thickness. It is divided into three sections in a Proctor Schwartz hot air drier oven and the sections are treated respectively with 0.95%, 1.90% and 3.0% silane-derivatized silicon dioxide, the same used in Example No. 1. Drying was conducted at 150°F. Table VI shows the times required to reach 1% moisture content without lumping or caking.

TABLE VI

| % Drying Aid | Thickness of Cake (inches) | | |
|---|---|---|---|
| | 0.5 | 1.5 | 3.0 |
| | Time in Hours | | |
| 0.95 | 6 | 18 | one fused mass |
| 1.90 | 5 | 16 | 30 |
| 3.07 | 4 | 13 | 28 |

Without the use of the drying aid this polymer formed one homogenous mass at 150° F. drying temperature.

From the foregoing examples, it can be seen that difficult to dry polymers can be dried at high temperatures without caking, gumming and balling.

This invention is intended to cover all changes and modifications of the examples of the invention herein chosen for purposes of disclosure, which do not constitute departures from the spirit and scope of the invention.

What is claimed is:

1. A method of drying materials normally difficult to dry and which tend to ball, stick or become gummy and which contain water including the steps of
   A. adding a hydrophobic silane-derivatized silicon dioxide to the material to be dried, said material containing water and tending normally to ball, stick or become gummy during drying,
   B. mixing the hydrophobic silane-derivatized silicon dioxide fine powder with said material to be dried to make said material less sticky and more flowable, and
   C. thereafter drying the mixture.

2. The method of claim 1 wherein the material to be dried is a cellulose-acetic anhydride polymer of 200,000 to 1,500,000 molecular weight and 1.0 to 1.6 degree of substitution.

3. The method of claim 1 wherein the silane-derivatized silicon dioxide has approximately 225 $M^2$/gm. surface area; approximately 7 $M\mu$ average particle size; approximately 3 lbs./ft.$^3$, bulk density; and a specific gravity of about 2.2.

4. The method of claim 1 wherein about 0.1% to about 10% hydrophobic silane-derivatized silicon dioxide fine powder on a dry solids basis is added to the material to be dried.

5. The method of claim 1 wherein the material to be dried contains about 25% to about 95% by weight dry substance and about 5% to about 75% by weight volatiles based on the weight of polymer solids and up to about 40% by weight organic solvents based on the weight of volatiles.

6. The method of claim 1 wherein the material to be dried is in a fine particle, wet cake form.

7. The method of claim 1 wherein the mixture is air-dried at an air temperature of about 100° F. to about 180° F.

8. The method of claim 1 wherein 1 to 3% on a dry solids basis of the hydrophobic silane-derivatized silicon dioxide powder is added to a cellulose acetic anhydride polymer containing abut 5 to about 75% volatiles based on the dry polymer solids, and the mixture is dried at air temperatures of about 100° F. to about 180° F. 180° F.

* * * * *